United States Patent
Blixt

(10) Patent No.: US 7,103,759 B1
(45) Date of Patent: Sep. 5, 2006

(54) MICROCONTROLLER ARCHITECTURE SUPPORTING MICROCODE-IMPLEMENTED PERIPHERAL DEVICES

(75) Inventor: Sven Stefan Blixt, Bålsta (SE)

(73) Assignee: Imsys Technologies AB, Upplands Vasby (SE)

( * ) Notice: Subject to any disclaimer, the term of this patent is extended or adjusted under 35 U.S.C. 154(b) by 0 days.

(21) Appl. No.: 09/429,748

(22) Filed: Oct. 28, 1999

(51) Int. Cl.
*G06F 13/10* (2006.01)

(52) U.S. Cl. ................... 712/248; 712/242; 703/24

(58) Field of Classification Search ............... 712/248, 712/242; 703/24–25
See application file for complete search history.

(56) References Cited

U.S. PATENT DOCUMENTS

| | | | |
|---|---|---|---|
| 3,478,322 A | * 11/1969 | Evans | 712/248 |
| 3,735,363 A | * 5/1973 | Beers et al. | 712/248 |
| 5,758,115 A | 5/1998 | Nevill | |
| 5,781,750 A | 7/1998 | Blomgren et al. | |
| 5,805,918 A | 9/1998 | Blomgren et al. | |

OTHER PUBLICATIONS

Hastie, Neil and Richard Cliff, The Implementation of Hardware Subroutines on Field Programmable Gate Arrays, 1990, IEEE Custom Integrated Circuits Conference, pp. 31.4.1 to 31.4.4.*

Rosenburg, Jerry M., Dictionary of Computers, Information Processing & Telecommunications, 1987, John Wiley and Sons, 2nd edition, pp. 460 and 461.*

Scenix: "SX Vertual Peripheral Library," 2 pgs, downloaded from www.scenix.com, 1999.

SCENIX, "Telephony Solutions: Bell 202 Modem Implementation Using the SX Microcontroller," 23 pgs, Feb. 1999 www.scenix.com.

C. Webb, "SCENIX: Designing Virtual Peripheral for the SX," Programming Considerations and Standards, 6 pgs, downloaded from www.scenix.com, 1999.

S. Holland, "Low-Cost Software, Bell-202 Modem," 9 pgs, Oct. 18, 2000 from www.scenix.com.

* cited by examiner

*Primary Examiner*—Henry W. H. Tsai
*Assistant Examiner*—Tonia L. Meonske
(74) *Attorney, Agent, or Firm*—Fish & Richardson P.C.

(57) ABSTRACT

Methods and apparatus for creating microcode-implemented peripheral devices for a microcontroller core formed in a monolithic integrated circuit. The microcontroller core has a control store for storing microcode instructions; execution circuitry operable to execute microcode instructions from the control store; and means for loading a suite of one or more microcode-device modules defining an optional peripheral device, the optional peripheral device being implemented by microcode instructions executed by the execution circuitry in accordance with the definition provided by the microcode-device modules.

20 Claims, 3 Drawing Sheets

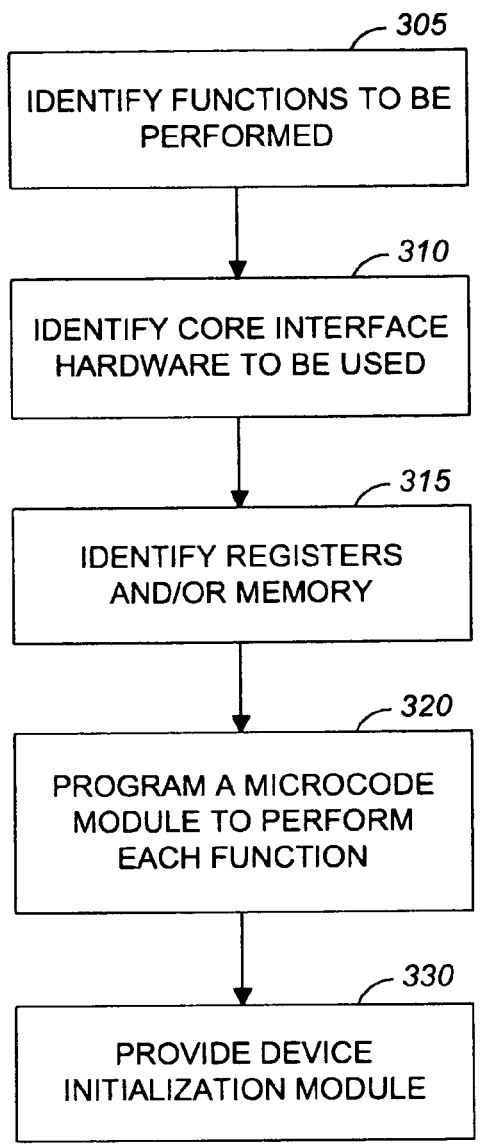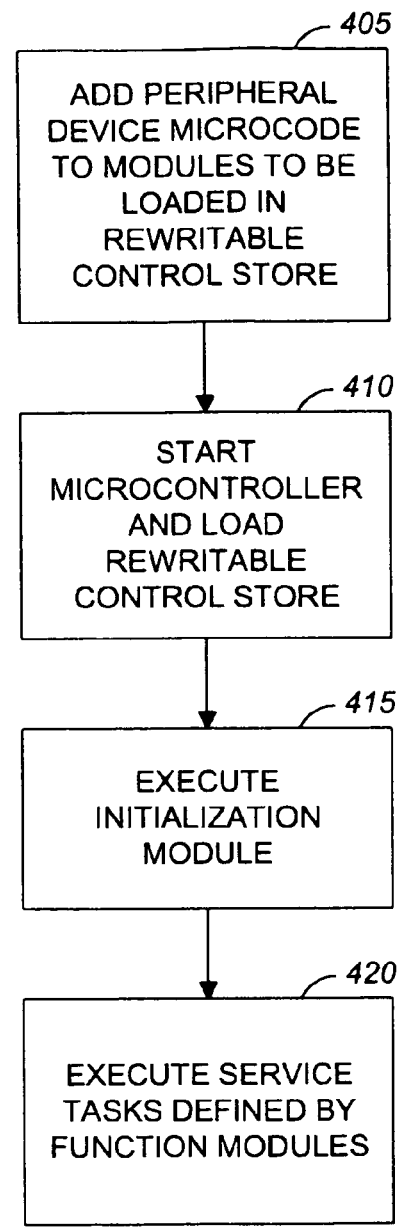
FIG. 3
FIG. 4

MICROCONTROLLER ARCHITECTURE SUPPORTING MICROCODE-IMPLEMENTED PERIPHERAL DEVICES

BACKGROUND OF THE INVENTION

The present invention relates to microcontroller architectures suitable for implementation in an integrated circuit.

An integrated circuit is electrical circuitry formed on a single monolithic semiconductor substrate. An integrated circuit can be implemented with one or more cores, which perform their various functions, and circuitry for communicating with external devices. A core is building-block circuitry that generally provides a desired high-level function. For example, a processor core is circuitry that executes a set of instructions that implement a processor architecture.

A microcontroller is an integrated circuit device. It has a processor core and communications cores or devices for connecting to peripheral devices. Microcontrollers are commonly employed as a primary control chip in a wide variety of non-computer products such as printers, cellular phones, televisions, and automobiles.

Microcontrollers provide programmable control (through programming of the processor core) of peripheral devices connected to them. Such programming is conventionally done using an instruction set defined by an instruction set architecture (ISA) implemented by the microcontroller core. To distinguish the instructions defined by the ISA from microcode instructions that may be used to implement them, the ISA instructions will be referred to in this specification as macro instructions.

Modern microcontrollers incorporate not only a processor core and communications cores, but also incorporate other commonly-employed device circuitry, such as blocks of memory and programmable timers. Integrating previously discrete components may lead to cost savings in the final product, because fewer components are needed. However, integration may increase the number of distinct microcontroller chips (integrated circuit products) that have to be manufactured, as different customers desire different configurations of additional devices.

Microcontroller suppliers traditionally have offered families of chips that differ in their on-chip complement of peripheral devices—things like timers, pulse generators, and so on. Microcontroller chips that include programmable logic with a processor core are also available.

SUMMARY OF THE INVENTION

The present invention provides a microcontroller architecture that supports configurable peripheral devices implemented in microcode instead of programmable logic or other circuitry.

In one aspect, the invention provides microcontroller apparatus that includes a microcontroller core formed in a monolithic integrated circuit. The microcontroller core has a control store for storing microcode instructions; execution circuitry operable to execute microcode instructions from the control store; and means for loading a suite of one or more microcode-device modules defining an optional peripheral device, the optional peripheral device being implemented by microcode instructions executed by the execution circuitry in accordance with the definition provided by the microcode-device modules.

In another aspect, the invention provides, in connection with a microcontroller product having a microcontroller core that is formed in a monolithic integrated circuit and that is operable to execute microcoded tasks in response to a timer interrupt, a method of configuring the product with an optional peripheral device. The method includes defining the operational functionality of the optional peripheral device in a suite of one or more modules; and providing the suite of modules for loading into a rewritable control store of the microcontroller core for execution; and loading the suite of modules in a rewritable portion of a control store of the microcontroller core to configure the product.

Advantages that can be seen in implementations of the invention include one or more of the following. Implementing frequently used peripheral functions in microcode can reduce total system cost and size. It can also reduce macro instruction fetch and execution cycles, thereby reducing demands on a power source such as a battery. It allows peripheral devices to be designed with resources, such as a multiplier or memory for lookup tables, that are already present on the microcontroller but would be relatively expensive on a separate peripheral device. It can also reduce time to market when compared to providing the same function in hardware.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a flowchart illustrating a process for creating a microcode-implemented device.

FIG. 4 is a flowchart of a method of configuring a microcontroller with a microcode-implemented device.

Like reference numbers and designations in the various drawings indicate like elements.

DETAILED DESCRIPTION

Figure 1:
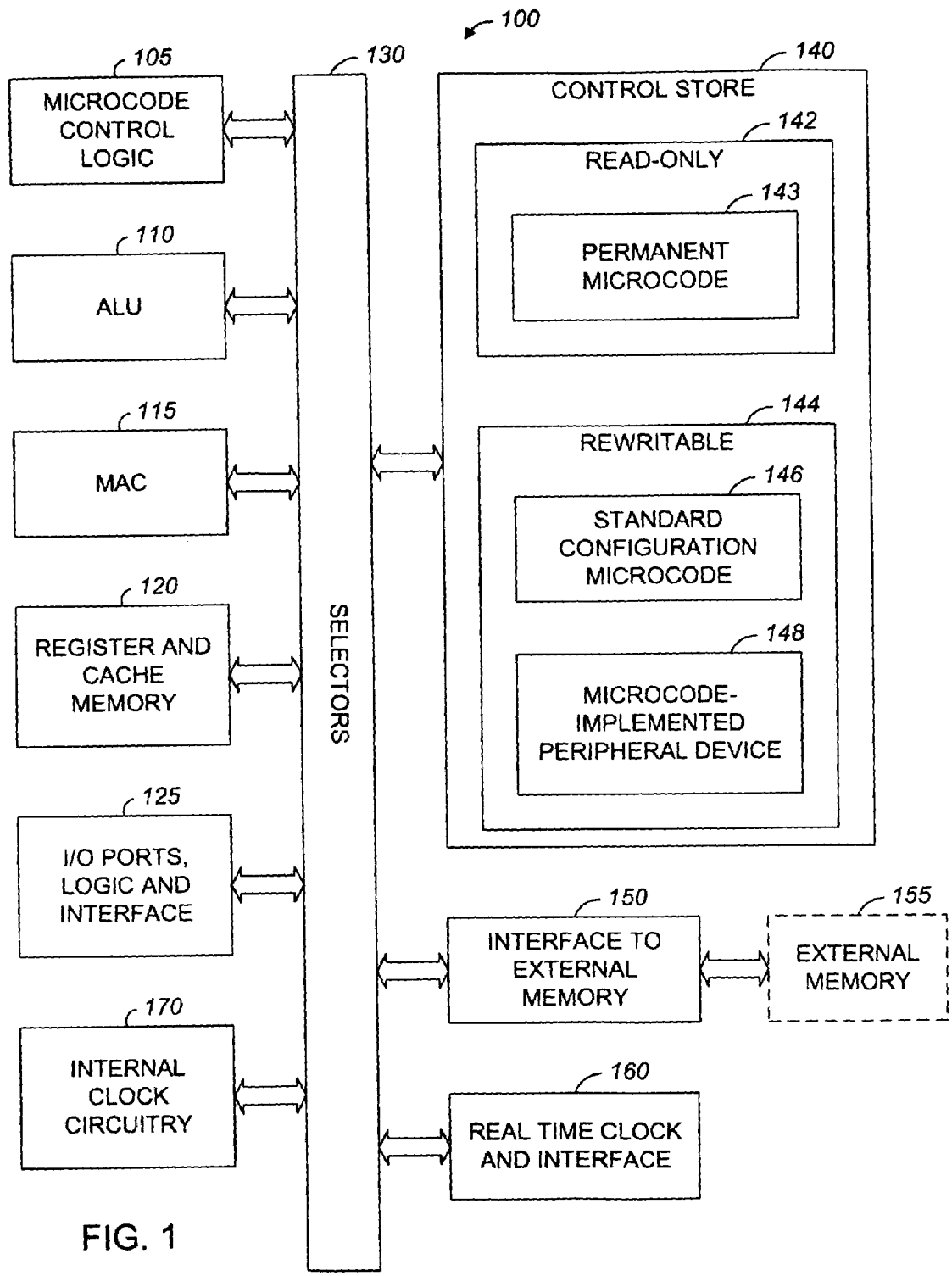
FIG. 1 is a block diagram of a microcontroller processor core of a microcontroller in accordance with the present invention.

As shown in FIG. 1, a microcontroller core 100 of a microcontroller in accordance with the present invention provides a scalar, microcoded CPU (central processing unit). The core includes microcode control logic 105, an ALU (arithmetic logic unit) 110, a MAC (multiply-accumulate unit) 115, and local operand storage in a register and cache memory 120. The MAC 115 is available to any microcode instruction and can execute an 8×8-bit multiply-add operation in a single microcode instruction. It has an accumulator 19 bits wide to store the extended results of iterative operations. The core also includes logic, circuitry and ports 125 to form the I/O (input output) interface of the core. The ports will generally be connected to I/O pins in a packaged integrated circuit product.

The microcode of the microcontroller core 100 is executed from a control store 140 made up of rewritable memory 144 and non-volatile ROM (read-only memory) 142. The rewritable portion 144 of the control store 140 can be implemented in on-chip SRAM (static random access memory) or DRAM (dynamic random access memory). The core has a memory interface 150 to memory 155 external to the core, which external memory can be on-chip or off-chip. A suitable interface 150 is described in commonly-owned copending PCT application serial number PCT/SE99/01923, designating the United States of America, for "Controlling Access to a Primary Memory" to Sven Stefan Blixt and Björn Stefan Christian Blixt, filed on Oct. 25, 1999, and its priority Swedish patent application serial number SE9803708-8 for "Controlling Access to a Dynamic Random Access Memory", to Sven Stefan Blixt, filed on Oct. 28, 1998, which are incorporated herein by reference.

Real time clock functions can be provided by a real time clock and interface circuitry 160. If used, this real time clock is driven by an external quartz resonator, such as a 32768 Hz resonator, and supported by battery backup.

The core also includes an on-chip circuitry 170 providing internal clock signals and including a main oscillator and PLL (phase-locked loop) circuitry locked to a reference oscillator that uses an external crystal. The main oscillator can provide clock events at an accurate, high frequency, such as 66.667 or 80 MHz, using a crystal of one quarter of that frequency.

These and other components of the microcontroller core 100 are interconnected with busses and selectors 130 in a manner conventional to microcoded CPUs. Designed for low-power operation, the data pathways of the microcontroller core 100 are generally 8 bits wide, as are the registers.

Standard configuration microcode for the microcontroller core includes permanent microcode 143, which is stored in the read-only portion 142 of the control store 140. In one configuration, the control store 140 has 36 kilobytes of on-chip ROM and 18 kilobytes of on-chip SRAM. The control store is organized into words matching the length of the microcode instructions (which are also called microinstructions). At startup, a boot loader implemented in the permanent microcode 143 loads the rewritable portion 146 of the standard configuration microcode, typically from an off-chip source such as flash memory connected to programmable I/O port pins of the I/O logic and interface circuitry 125. After the microcontroller boots itself and initializes memory, more microcode can be loaded from the same or other sources. This sequence allows customized or patched microcode to reside in a connected device or elsewhere. This sequence will load that part of the standard configuration of microcode for the microcontroller core 100 that was not included in the read-only portion 142 of the control store 140. The microcode loaded into the rewritable portion 144 at any stage can include microcode 148 for peripheral devices implemented in microcode, which will be described below. After startup, an application program can use a special assembly-language instruction to load fresh microcode at any time, which allows applications to alter the macro instruction set of the microcontroller on the fly.

The microcontroller core 100 is designed to be implemented, and is implemented, on a single monolithic semiconductor substrate. The memory on board the microcontroller chip can optionally include memory for application software and data.

In operation, microcode instructions are decoded by the microcode control logic 105 to produce various control signals that are passed to the different functional elements of the core. In response, the elements of the core perform operations such as multiplication, addition, shifting, and logical operations. As is conventional, the microcode instruction has a long instruction word format—in the present implementation, it is 72 bits wide—and can cause the core to perform numerous operations in parallel, including selecting the next microinstruction to be executed.

The register and cache memory 120 provides storage for use by the microcode. This memory is used, for example, to provide register storage for register-based macro instructions and stack storage for stack-based macro instructions. It can be implemented in 1 kilobyte of SRAM, with stack overflow to an external memory such as memory 155.

Macro instructions are implemented as microprograms, i.e., as sequences of one or more microcode instructions. Microcode sequence control (sometimes called flow control) is controlled by fields of the microinstruction, where one field selects a kind of jump, for example, and another field selects a condition for that jump. The microcontroller core 100 has several types of multiway jumps. One type is a table jump, which decodes combinations of condition flip-flops in the arithmetic unit. Another type is a decode jump that decodes an 8-bit macro instruction opcode (whether read either directly from memory or from an instruction register IR) and jumps into a 256-word decode table.

A microinstruction sets up all the control signals for the logic in the microcontroller, so that data flows into the ALU, the MAC, and other processing units, and so that these units do the required processing operation on the data flowing into them and output the results, which then flow to the destinations specified by the microinstruction. This includes the calculation of the next microinstruction address. A microinstruction execution time ends at the rising edge of an execute clock signal, which loads the new state in the processor. Thus, a microinstruction executes and, simultaneously, fetches the next microinstruction.

Figure 2:
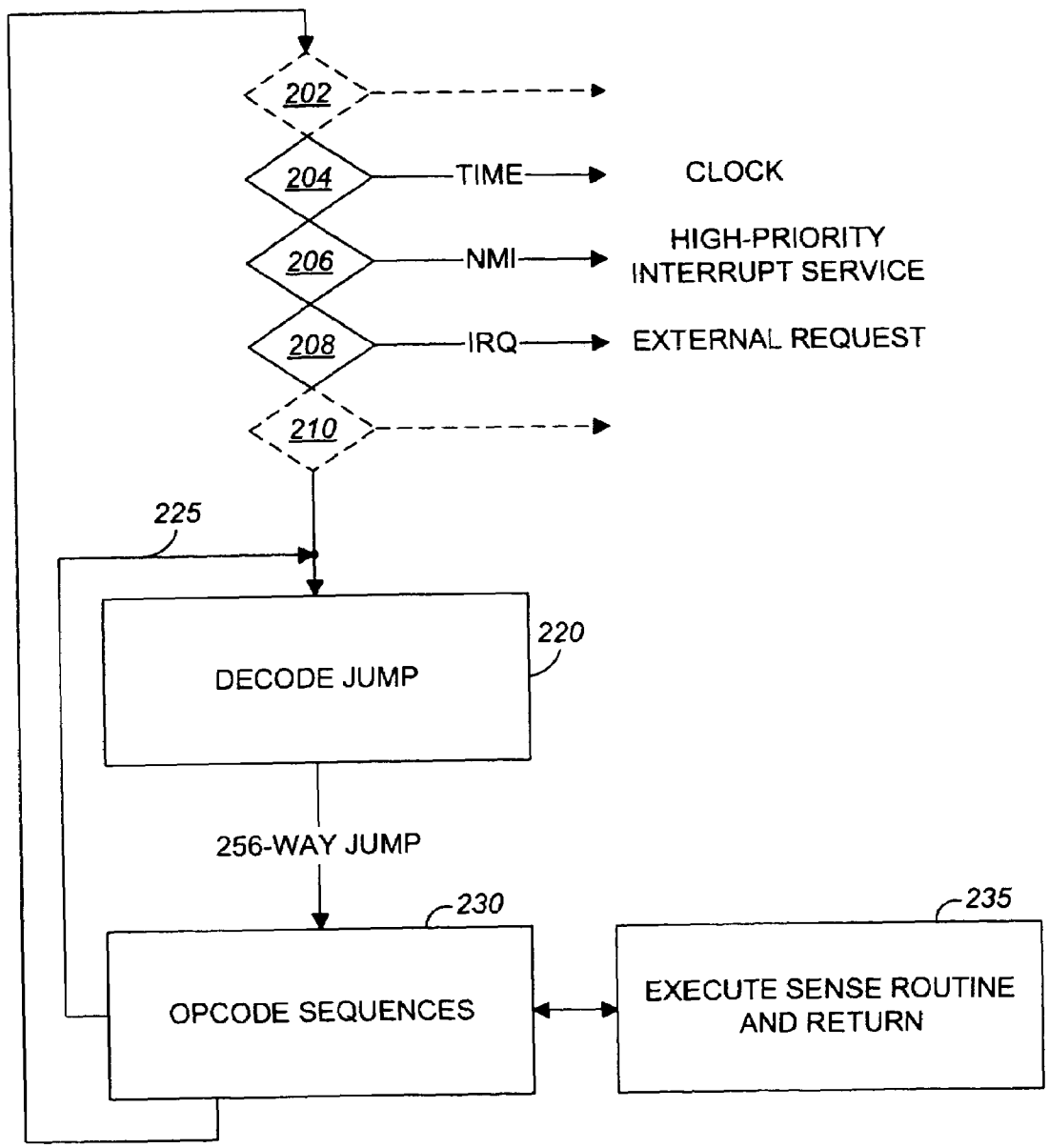
FIG. 2 is a flowchart illustrating flow control by the microcontroller core.

FIG. 2 illustrates the relevant aspects of flow control in the microcontroller core. The illustration begins with a series of conditional-jump boxes 202, 204, 206, 208, 210, which are drawn directly together to indicate that they are actually not performed sequentially. The tests illustrated by the conditional-jump boxes 202, 204, 206, 208, 210 are performed in hardware by a priority encoder, and they are done simultaneously with, and as part of the execution of, the last microinstruction of the execution sequence for each macro instruction opcode.

There are approximately as many sequences as there are opcodes, and they are illustrated in the aggregate as opcode sequences 230. For multiple macro instruction sets, partial or entire sets of alternative sequences 230 are implemented. Each sequence starts in a slot in a decode table of 256 microinstructions. The conditional-jump boxes 202, 204, 206, 208, 210 represent the multiway jump made in the last microinstruction of each execution sequence. Each jump is made to a micro instruction contained in a fetch table. The normal flow is to the fetch table microinstruction 220, which performs a number of actions including a decode jump that gives control to one of the 256 instructions in a 256-entry decode table, which is part of the opcode sequences 230, according to the current macro instruction opcode. To switch from one instruction set to another, a microinstruction need only change the current fetch table, which changes the current decode table. In principal, any number of fetch tables, and therefore any number of instruction sets, can be created.

The multiway jump represented by boxes 202, 204, 206, 208, 210 is a jump into the current fetch table. The least significant bits of the jump address are generated by a priority encoder, the inputs to which come from several different sources, including an internal time interrupt request signal and two external interrupt request signals, NMI (non-maskable interrupt) and IRQ (interrupt request). The IRQ condition causes a jump to a microcode sequence that identifies and acknowledges the external request and sets a flag in an interrupt register IRR, which is simply a reserved area of memory, such as external memory 155 (FIG. 1). The NMI condition executes microcode tasks requiring high-priority interrupt service. The time interrupt performs a number of services, which will be described later.

A microcode sequence can exit in one of a number of alternative ways. For example, opcode sequences that need to be chained to the next macro instruction without the possibility of an intervening interrupt exit to the fetch table instruction 220, bypassing the conditional-jump blocks 202, 204, 206, 208, 210 (flow path 225).

A sequence can also be programmed to suspend its processing by calling a sense routine 235, which performs its function and then returns to continue execution of the sequence that called it. The sense routine is used in the execution of opcodes that require very long execution time. Its main purpose is to check and service the time interrupt signal, so that every such request will get guaranteed service before the next one arrives, which is the same service provided in response to a time interrupt signal at jump box 204. This interrupt occurs at a sufficiently high frequency, such as 16 kHz or greater, to allow the scheduled tasks to provide real-time services.

The time service includes doing as many DRAM refresh cycles as are needed, if the microcontroller has, or is connected to, DRAM memory. It also includes adding a time increment to a time accumulator in memory, incrementing a milliseconds counter (also in memory) if it overflows, and updating the memory cells containing the time-of-day when the millisecond counter indicates this should be done. When these fixed tasks have been performed, the microcontrol program continues and performs other scheduled tasks.

The scheduled tasks can be configured to perform the functions of peripheral devices. For example, they can stream data (through a DMA buffer memory) to a print engine, or from a scanner engine, or to or from an external communications device. Separately or as part of the process of streaming data, scheduled tasks can also provide filtering functions, or compression/decompression functions, that act on such data streams that pass between I/O devices and memory, or from memory to memory, or from input device to output device. These functions can be performed by scheduled tasks because microinstructions have access to all of the processing resources of the microcontroller, including the MAC, and all data transfers within the microcontroller are performed by microcode.

A basic peripheral device function—from which numerous other functions can be built—is a timer function. This function can be performed by a scheduled task (i.e., a microcode sequence) that increments or decrements a counter value in memory and detects whether it reaches a predefined number such as zero. If so, the timer function performs an action that is specified by one or more device control parameters stored in memory. The memory cells containing the parameters belong to a scheduled instantiation of this type of timer. Several timers of the same type using common microcode can be scheduled. Shared microcode for common standard types can optionally be included in the ROM microcode 143. Timers can be chained to each other through control parameters. Timers can have parameters for start values and have actions like writing "1" or "0" to an output pin selected by parameter. In this way a pair of timers can generate a pulse train with specified frequency and duty cycle. Combinations of such pulsed signals, with specified phase and/or frequency relations, can readily be defined for purposes such as driving a stepper motor or a display.

The device control parameters can be organized with other data in a controlling data structure (a control block). For example, the initial state of a periodic pulse train signal can be defined in a control block as having any phase, so that a pair of such signals driving a stepper motor has the proper phase difference. The control block can also contain a total number of counts that is copied to a count variable when that variable has reached zero. Alternative to use of a simple one-step integer counter, an accumulator value can be used that is never restarted by loading a fixed value, but instead is increased each time by a fixed value (not simply 1) and the specified action is taken when the accumulator overflows.

An action specified for a timer can set an interrupt request in a specified bit position in an interrupt register IRR, for example, or otherwise set a condition that will be treated by the microcontroller core like a hardware interrupt from a hardware device.

The action of a timer function can also be to generate a general reset of the processor, as in a watchdog function. Such a timer must be restarted by the software at some minimum frequency; if the program derails or hangs, the watchdog will cause a restart of the system.

The scheduling can be controlled by a data structure in a memory such as memory 155. The data structure can be created and modified by software such as a development system, described below, and can be organized in a data structure such as an ordered list of elements. The elements would be accessed and acted upon, one by one in order, by a scheduled task in the time interrupt service microcode. Each element describes one task. Elements can optionally have a variable size according to the number of parameters the corresponding specific task type needs. When the last task has been performed, the microprogram can act on any requests that have been generated by the tasks and then return to normal instruction execution.

Thus, scheduled tasks can be used to implement microcode-implemented peripheral devices.

The scheduling of tasks that implement such virtual devices can be done using a table in a memory to list the device tasks in the order in which they are to be executed. The table identifies the virtual device by its microprogram start address (or an address surrogate) and includes the device parameters. The start address can be in ROM 142 or RAM 144. The device microcode can share control store space by using common microinstruction subroutines.

A development system is used by one or more program developers to create programming for the microcontroller core. The development system is a conventional integrated environment running on a general purpose platform, such as a personal computer running the Microsoft® Windows® operating system, providing programming and debugging tools through a graphical user interface. The development system includes assemblers and compilers for developing and debugging software on all programming levels. Generally, a manufacturer of a microcontroller device will provide the microcode for one or more instruction sets—such as a CISC (Complex Instruction Set Computer) instruction set and a Java Virtual Machine bytecode instruction set—and control microcode to manage service tasks and generally handle housekeeping functions.

With conventional microcontrollers, a customer would typically buy a version of the microcontroller configured with the peripheral devices needed by the customer's application and then provide the programming for that application. The application programming is generally done in assembly or a higher-level language using a development system provided by the microcontroller vendor.

As shown in FIG. 1, with a microcontroller or microcontroller core made in accordance with the present invention, the vendor need not provide separate versions with separate configurations of peripheral devices. Instead, the vendor, customer, or a third party can provide microcode 148 implementing the peripheral devices desired by the customer. This is then loaded into the rewritable control store 144 along with the standard microcode 146 for the microcontroller core 100, to provide a microcontroller or microcontroller core configured with the peripheral devices desired by the customer.

FIG. 3 illustrates one way a programmer can create a microcode-implemented device. First, the operational functionality of the device is identified (step 305) by identifying functions that can each be performed by a sequence of microcode instructions. The hardware interface elements of the microcontroller core that will be used as the external interface, if any, for the microcode-implemented device must also be identified (step 310). These will be selected from among the I/O ports and related logic and interface circuitry 125 (FIG. 1) of the core according to availability and suitability. Memory and/or core registers also have to be identified for use by the modules implementing the device (step 315). Because the customer is providing all the add-on programming for the core, the programmer can use any of the resources of the core not already used by the manufacturer or the customer's vendor. The programmer then writes microcode-device modules to perform the operational functions and interact with the interface hardware, if any, and the programmatic interface of the microcode-implemented device (step 320). The programmer may also provide a device initialization module (step 330) to be executed by the microcontrol program of the microcontroller core at initialization time, to initialize any resources reserved for use by the device and to enqueue any initial modules for execution.

As shown in FIG. 4, to install a microcode-implemented peripheral device in a microcontroller core made in accordance with the invention, a suite of one or more microcode-device modules implementing the peripheral device are added to a microcode file that will be read into the rewritable portion of the control store (step 405). Such a module may include microcode instructions or device control data. If a module is simply device control data, such as a table entry including a control store address and device control parameters, as described above, the module can and generally will be read into some other memory, such as external memory 155, for use by microcode instructions implementing a service task. When the microcontroller initializes itself, the file is loaded into the control store, which loads the microcode-implemented device (step 410). Any device initialization module is recognized and executed by the microcontrol program (step 415). The microcontrol program then executes the modules of the microcode-implemented peripheral device as a service task, as has been described (step 420).

A few further examples of virtual devices will now be given.

As described above, a pulse generator can be built from two basic timer devices. In one implementation, the timers are of a type that count up or down at each time interrupt until they reach the end, and then do their action and stop in an end state. The action changes the signal on an output pin and starts another timer of the same kind by initializing its counter. In an alternative implementation, the microcode-device module specifies microcode instructions for a complete pulse generator type of device, having a state bit keeping track of its state (high or low) and two initialization constants. This is a repetitive type of device that would not stop when at the end count, but instead reinitialize itself in the opposite state. With a third basic timer device or with a pulse generator device maintaining a third pin state, a pulse train with a third level can be produced.

Alternatively, each of these types of devices can use the other, more accurate way of counting, described above, in which an accumulator is incremented without reset by an appropriately selected value.

A higher level pattern generator device can be built to generate patterns of pulse trains, and data transfers can be coupled to the generated pulses. Stepper motors, for example, need pulse signals that have variable frequency and phase. Audio tones can be produced by pulse-width modulation by a sinusoidal signal: the service task for the virtual audio device can fetch the required data from a table in memory 155.

Sometimes one needs to generate a pulse with a width too narrow to be generated in the way that has been described, but not narrow enough to be done within an interrupt time tick. To support implementation of such a narrow-width pulse generator, the microcontroller core is configured with an optional hardware counter. This counter can be started by a microcode instruction loading it with a non-zero value. Once started it counts pulses derived from the main oscillator. When it reaches zero it stops counting and causes a high-priority hardware interrupt request, such as request 202 (FIG. 1) to be set. When this request is detected, a service task similar to the one described for the time interrupt tick is invoked. There, actions specified for a trailing pulse edge are executed.

More than one narrow-width pulse generator device can be supported if needed. Because the counter is used for short pulses that are started at time ticks, one can assume that it will always have reached zero and is inactivate when the time interrupt service task is executed. If the schedule for service tasks includes narrow-width pulse generator devices, each one of will have its companion trailing edge device scheduled in another, trailing-edge list that will be used by the high-priority interrupt service microprogram that will follow some microseconds later. When the time request service scheduler finds a narrow-width pulse device, and finds that this device is now in the state when it should perform its leading-edge action, i.e., start its pulse (and do some data transfer if specified), the microprogram will do that. It will also indicate, in the device's data space (its device control parameters), that the device has an active pulse. Then the microprogram copies a device-identifier byte that identifies the device to a device-identifier location, and copies one of the device's parameters (the pulse width measured in counter clock pulses) into the counter—however, it will not do these two actions if the counter already contains a nonzero value smaller than or equal to the pulse width parameter. This can happen an narrow-pulse device earlier in the list starts its pulse on the same time interrupt tick. The microprogram indicates this very special situation with a special marker bit in memory, in a way that is easy for the high-priority interrupt service microprogram to detect.

The high-priority interrupt service microprogram is invoked when the counter reaches zero. It will read the device-identifier location, thereby identifying the pulse-starting device (or one of them), and perform that device's parameter-specified trailing edge actions and eliminate its active-pulse state indication. If the special marker bit is set, it will search for all devices having an active pulse state, selecting the one with the lowest value of pulse width, and load the counter with the difference between that pulse width and that of the device just serviced. If the difference is zero it will do the actions for the found device also, and find a new one with the lowest pulse width, and so on. This way several pulses with same or different pulse width can be allowed to overlap and be independent from each other.

Virtual devices can be used to implement LCD (liquid crystal display) driving that is configurable and can accept many different LCD types. A bigger graphic LCD normally needs parallel input data, a clock signal to clock in the data and control the scanning (stepping from a pixel to the next in a color or grayscale device, or stepping from 8 pixels to the next 8 pixels in a bilevel monochrome device), and frame or synch signals for the synchronization of the phase of the scanning process to the input data. Some scanner sensors and print engines need the same kinds of signals. The required signals can be provided by microcoded repetitive pulse generators having parameters giving them different frequencies, can be coupled by specialized actions to provide a pattern of dot clock, line synch (horizontal synch), and frame synch (vertical synch).

Sometimes the dot clock (or at least the data transfer) should be inhibited for some time between lines and/or frames. Such effects can be accomplished by a hierarchical (tree) structure for the scheduling, allowing one virtual device to control (enable/disable) another, lower-level, virtual device.

Another example application is to key switches, which are normally connected in a matrix of row and column lines. Depressing a key connects one row line to one column line. Microcontroller ports can be used to drive one set of lines, e.g. rows, while sensing the other set. A 4×5 key matrix thus requires 4 output ports and 5 input ports (or vice versa).

Such a keypad can be scanned in the following way, for the case of 4 output ports.

---

Begin: Store 0,1,1,1, respectively, on the output port pin data flip-flops.
  Some time later: read the inputs and store them in a byte in memory.
  Some time later: Store 1,0,1,1, respectively, on the output port pin data flip-flops.
  Some time later: read the inputs and store them in a byte in memory.
  Some time later: Store 1,1,0,1, respectively, on the output port pin data flip-flops.
  Some time later: read the inputs and store them in a byte in memory.
  Some time later: Store 1,1,1,0, respectively, on the output port pin data flip-flops.
End: Some time later: read the inputs and store them in a byte in memory
Compare the received four bytes with the four bytes received during the previous iteration of Begin to End and set a keyboard interrupt request if any difference is found.
Some time later: Go back to Begin.
The "some time" can be in the range of 5 to 10 ms (milliseconds).

---

Another example application implements a method of automatically transferring parts of several bitmap images from memory to an LCD, such that one can select viewports in the memory image areas and divide the LCD screen into windows. A viewport-window pair defines a copy transformation from memory to LCD. These transformations are specified in a table in memory. The LCD has to be refreshed (scanned) at a steady rate, which generally gives a frame frequency of about 80 Hz.

When the automatic transfer service task, scheduled on the time tick, fetches data in the memory, it increments its memory pointer for the data in order to fetch the next data next time. It also checks, by a simple countdown, whether it has reached the right-hand edge of the window it is writing into. If so, it will look in a table to find the viewport and starting source address it should use at the point (a left edge) in the window it is entering. It also loads the count value corresponding to the width of this window. In this way multiple windows can be implemented, the contents of which will scroll "softly", scan line by scan line or pixel column by pixel column, without moving data in the memory. Soft-scrolling lists on display on a mobile telephone, for example, is useful because it is easier for the eye to follow it can be done with little more than changing a few parameters in a window definition table (instead of moving bitmaps in memory).

A line table format that can be used to define the windows on a screen in a way that can be used by such a method has five columns. Consider the following simple example.

| line | scanline | bmpadr   | width | modulo |
|------|----------|----------|-------|--------|
| 0    | 0        | xxxxxxxx | 100   | 20     |
| 1    | 0        | yyyyyyyy | 50    | 10     |
| 2    | 150      | zzzzzzzz | 100   | 30     |
| 3    | 150      | aaaaaaaa | 50    | 10     |

When the microprogram starts updating of the screen on scanline 0, it reads line 0 from the table. The information there says that 100 bytes should be copied to the screen from address xxxxxxx. Line 1 says copy 50 bytes from address yyyyyyy. On line 2 scanline=150, which means that information from here in the table is for scanlines >=150. Lines 0 and 1 in the table will therefore be reused. To draw scanline 1 on the screen, 100 bytes are copied from xxxxxxx+20 and 50 bytes, from address yyyyyyy+10. For each scanline the modulo-value is added to the address. This continues until current scanline reaches 150 when lines 2 and 3 are used in the same way. The foregoing example provides simple tiling; however, this technique also allows one to define a window that appears to float on top of others.

The invention has been described in terms of particular embodiments. Other embodiments are within the scope of one or more of the following claims. For example, the steps of the invention can be performed in a different order and still achieve desirable results. In an alternative embodiment, the microcontroller core can be configured with special purpose circuitry for loading microcode instructions into a rewritable control store, in which case the entire control store can be rewritable. In a further alternative embodiment, the microcontroller core can be configured with modules of microcode-device instructions in a read-only control store, and virtual devices can be implemented solely by appropriate definition of control blocks defining fundamental functions such as timers. In this embodiment, the control blocks or device control data can be organized using a data structure such as a linked list or a tree that can be navigated by a service task implemented in read-only control store to implement the virtual devices defined by the device control data. The design of the microcontroller core can be represented in a synthesizable HDL (hardware description language) description, such as a VHDL description (VHSIC (Very High Speed Integrated Circuits) HDL. A synthesizable VHDL description constitutes a set of programmatic instructions from which a microcontroller chip can be manufactured.

What is claimed is:

1. Microcontroller apparatus comprising a microcontroller core formed in a monolithic integrated circuit, the microcontroller core implementing one or more macro instructions, the microcontroller core comprising:
  a control store for storing microcode instructions;

execution circuitry operable to execute microcode instructions from the control store; and means for loading a suite of one or more microcode-device modules defining an optional peripheral device, the optional peripheral device being implemented by microcode instructions executed by the execution circuitry in accordance with the definition provided by the microcode-device modules, the optional peripheral device being controlled using one or more of the macro instructions, the optional peripheral device beg implemented as one or more scheduled microcode-instruction tasks, that are scheduled by a scheduling microcode instruction task.

2. The apparatus of claim 1, wherein:

the control store consists solely of a read-only portion; and the means for loading comprises microcode instructions in the read-only portion, the instructions being operable to load one or more microcode-device modules of device control data into a memory accessible to microcode instructions executed by the execution circuitry.

3. The apparatus of claim 1, wherein:

the control store consists solely of a rewritable portion; and the means for loading comprises circuitry operable to load one or more microcode-device modules of microcode instructions into the rewritable portion of the control store.

4. The apparatus of claim 1, wherein:

the control store comprises a read-only portion and a rewritable portion; and the means for loading comprises microcode instructions in the read-only portion, the instructions being operable to load one or more microcode-device modules of microcode instructions into the rewritable portion of the control store.

5. The apparatus of claim 4, wherein:

the optional peripheral device is a timer.

6. The apparatus of claim 5, wherein:

the suite of modules defining a timer comprises data defining a start address in the control store for a timer microcode sequence and data defining control parameters for timer operation.

7. The apparatus of claim 6, wherein:

the timer microcode sequence defines a service task to be executed as a scheduled service task at a regular time interval, the service task operating to determine whether it is time to perform an action and, if it is, performing the action.

8. The apparatus of claim 7, wherein:

the regular time interval is determined by an interrupt;

the service task determines whether it is time to perform the action by incrementing or decrementing a counter associated with the timer and determining whether the counter has reached a predetermined number; and the action is specified by one or more device control parameters stored in a memory accessible to microcode instructions executed by the microcontroller core.

9. The apparatus of claim 7, wherein:

the interrupt occurs at a frequency of 16 kHz or greater;

the apparatus comprises an output pin; and the action comprises writing a "1" or a "0" signal to the output pin at a time defined by a device control parameter.

10. The apparatus of claim 4, wherein:

the optional peripheral device is a pulse generator.

11. The apparatus of claim 10, wherein:

the suite of modules defining a pulse generator comprises data defining a start address in the control store for a first and a second pulse generator microcode sequence and data defining control parameters for pulse generator operation;

the first and second pulse generator microcode sequences define a respective first and second service task to be executed as scheduled service tasks at a regular time interval, each first and second service task operating to determine whether it is time to perform a respective action and, if it is, performing the respective action;

the apparatus comprises an output pin; and the respective action comprises writing a "1" or a "0" signal, respectively, to the output pin at a time defined by a device control parameter, whereby a pulse train is generated on the output pin.

12. The apparatus of claim 4, wherein:

the execution circuitry comprises an arithmetic logic unit and a multiply-accumulate unit accessible to microcode instructions.

13. The apparatus of claim 12, wherein:

the optional peripheral device is a digital filter.

14. The apparatus of claim 12, wherein:

the optional peripheral device is a stepper motor controller.

15. The apparatus of claim 12, wherein:

the optional peripheral device is a data compressor or decompressor.

16. In connection with a microcontroller product comprising a microcontroller core formed in a monolithic integrated circuit, the microcontroller core implementing one or more macro instructions, the microcontroller product being operable to execute microcoded tasks in response to an interrupt, a method of configuring the product with an optional peripheral device, the optional peripheral device being controlled using one or more of the macro instructions, the method comprising:

defining the operational functionality of the optional peripheral device in a suite of one or more modules implemented as microcode tasks, the microcode tasks comprising one or more scheduled microcode-instruction tasks, that are scheduled by a scheduling microcode-instruction task;

providing the suite of modules for loading into a rewritable control store of the microcontroller core for execution; and loading the suite of modules in a rewritable portion of a control store of the microcontroller core to configure the product.

17. The method of claim 16, wherein:

the optional peripheral device is a timer.

18. The method of claim 16, wherein:

the optional peripheral device is a pulse generator.

19. The method of claim 16, wherein:

the optional peripheral device is a stepper motor controller.

20. The method of claim 16, wherein:

the optional peripheral device is a digital filter.

* * * * *

UNITED STATES PATENT AND TRADEMARK OFFICE
CERTIFICATE OF CORRECTION

| | |
|---|---|
| PATENT NO. | : 7,103,759 B1 |
| APPLICATION NO. | : 09/429748 |
| DATED | : September 5, 2006 |
| INVENTOR(S) | : Sven Stefan Blixt |

It is certified that error appears in the above-identified patent and that said Letters Patent is hereby corrected as shown below:

Col. 11, line 10 replace "peripheral device beg" with --peripheral device being--.

Signed and Sealed this

Second Day of January, 2007

JON W. DUDAS
*Director of the United States Patent and Trademark Office*